Aug. 20, 1968        E. R. HATTENDORF        3,398,267
AIRCRAFT VERTICAL PATH COMPUTER
Filed Sept. 14, 1964                5 Sheets-Sheet 1
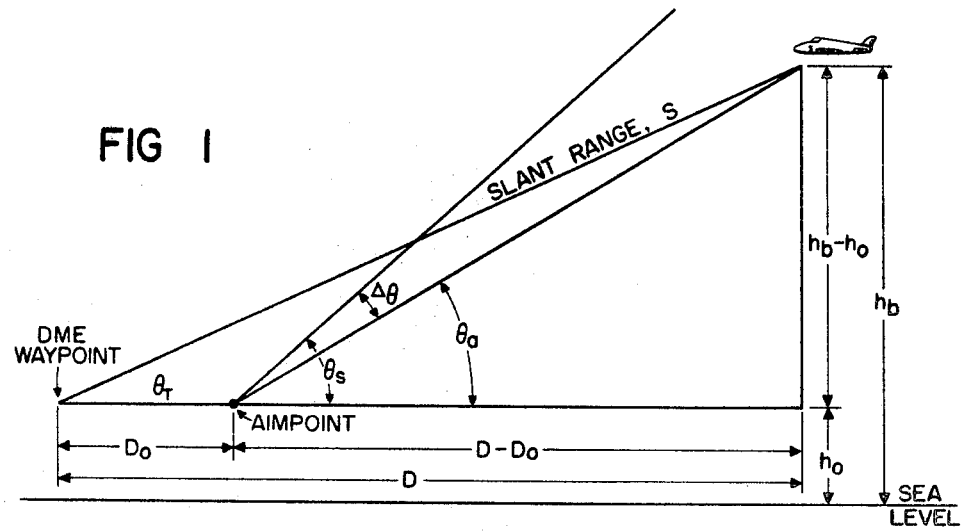
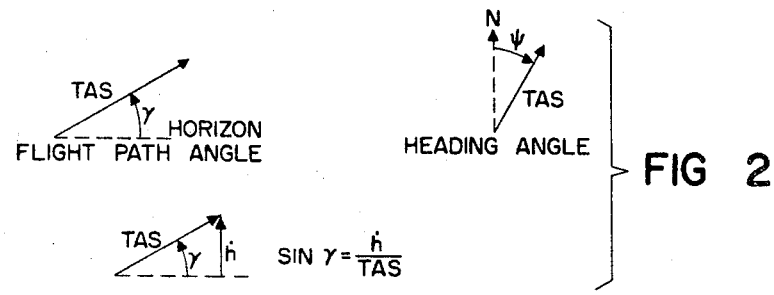
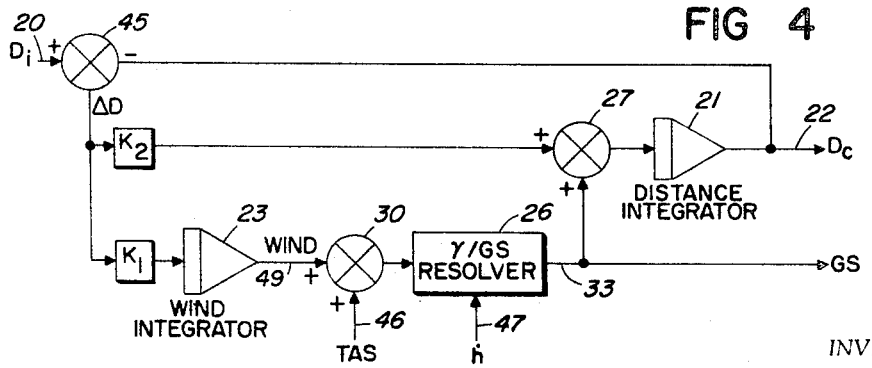
INVENTOR.
EDWIN R. HATTENDORF
BY
Moody & Anderson
AGENTS Aug. 20, 1968  E. R. HATTENDORF  3,398,267
AIRCRAFT VERTICAL PATH COMPUTER
Filed Sept. 14, 1964  5 Sheets-Sheet 4

INVENTOR.
EDWIN R. HATTENDORF
BY
Moody & Anderson
AGENTS

INVENTOR.
EDWIN R. HATTENDORF
BY
Moody & Anderson
AGENTS

United States Patent Office 3,398,267
Patented Aug. 20, 1968

3,398,267
AIRCRAFT VERTICAL PATH COMPUTER
Edwin R. Hattendorf, Cedar Rapids, Iowa, assignor to Collins Radio Company, Cedar Rapids, Iowa, a corporation of Iowa
Filed Sept. 14, 1964, Ser. No. 396,154
8 Claims. (Cl. 235—150.26)

ABSTRACT OF THE DISCLOSURE

An aircraft vertical path computing mechanism developing accurate information of ground distance to a way point, flight path angle, vertical path deviation, and time-to-go from input parameters of distance, air speed and altitude in a manner such that the computed output signals are compensated for longitudinal wind and distance measuring equipment noise.

In the specification:

This invention relates generally to aircraft guidance and more particularly to aircraft navigation in the vertical plane. The invention is specifically related to a device which will accept guidance command and sensor information from navigation equipments and process this information to obtain longitudinal steering signals for the pilot.

With the advent of increasing numbers of aircraft and generally increasing congestion about aircraft terminal areas, the aircraft guidance art has developed means for controlling an aircraft in the vertical plane as well as in the horizontal. Automatic flight control means have been developed to a high degree of sophistication for guiding an aircraft in the horizontal plane. Vertical guidance has generally been limited to the acquisition of and descent down a defined radio beam in space such as the conventional glide slope facility. Increased numbers of aircraft have necessitated a further degree of aircraft control wherein the vertical guidance problem must necessarily be extended beyond the point at which a glide slope beam is acquired. The development of high performance jet aircraft has further placed stringent requirements in this regard.

It is an object therefore of the present invention to provide a vertical path computer by means of which aircraft control in the vertical plane may be extended to enable the attainment and precision tracking of flight paths in the vertical plane during stages of flight preceding the acquisition of the glide slope landing beam.

A still further object of the present invention is the provision of a vertical path flight computer computing vertical path deviation from any preselected vertical path as defined by a given angle with respect to a desired ground aimpoint.

A still further object of the present invention is the provision of a vertical path flight computer capable of computing a flight path angle having no geographic reference, enabling guidance modes in the vertical plane comparable to heading in the lateral axis.

A still further object of the present invention is the provision of a vertical path flight computer capable of providing an indication of ground distance to a selected way point and an indication of time-to-go to a selected way point.

The invention is featured in the provision of means for applying complementary filtering techniques to distance-definitive input signals by complementing the distance definitive signals with true air speed or ground speed information to eliminate filter lags.

A still further feature of the present invention is the provision of a vertical path flight computer providing indications of flight path angle and distance-to-go to a selected way point wherein each of the computer parameters are compensated for longitudinal wind components.

A still further feature of the present invention is the provision of the vertical path flight computer incorporating a novel memory feature whereby control signals are developed upon the loss of valid input distance definitive signals on the basis of a memorized wind; and ground distance is derived on the basis of integrated ground speed derived from true air speed and memorized wind.

These and other features and objects of the present invention will become apparent upon reading the following description in conjunction with the accompanying drawings in which;

FIGURE 1 is a diagrammatic representation of the vertical path geometry involved;

FIGURE 2 represents diagrammatically the solution for flight path angle in accordance with the invention;

FIGURE 4 is a simplified distance signal filtering block diagram;

Figure 3:
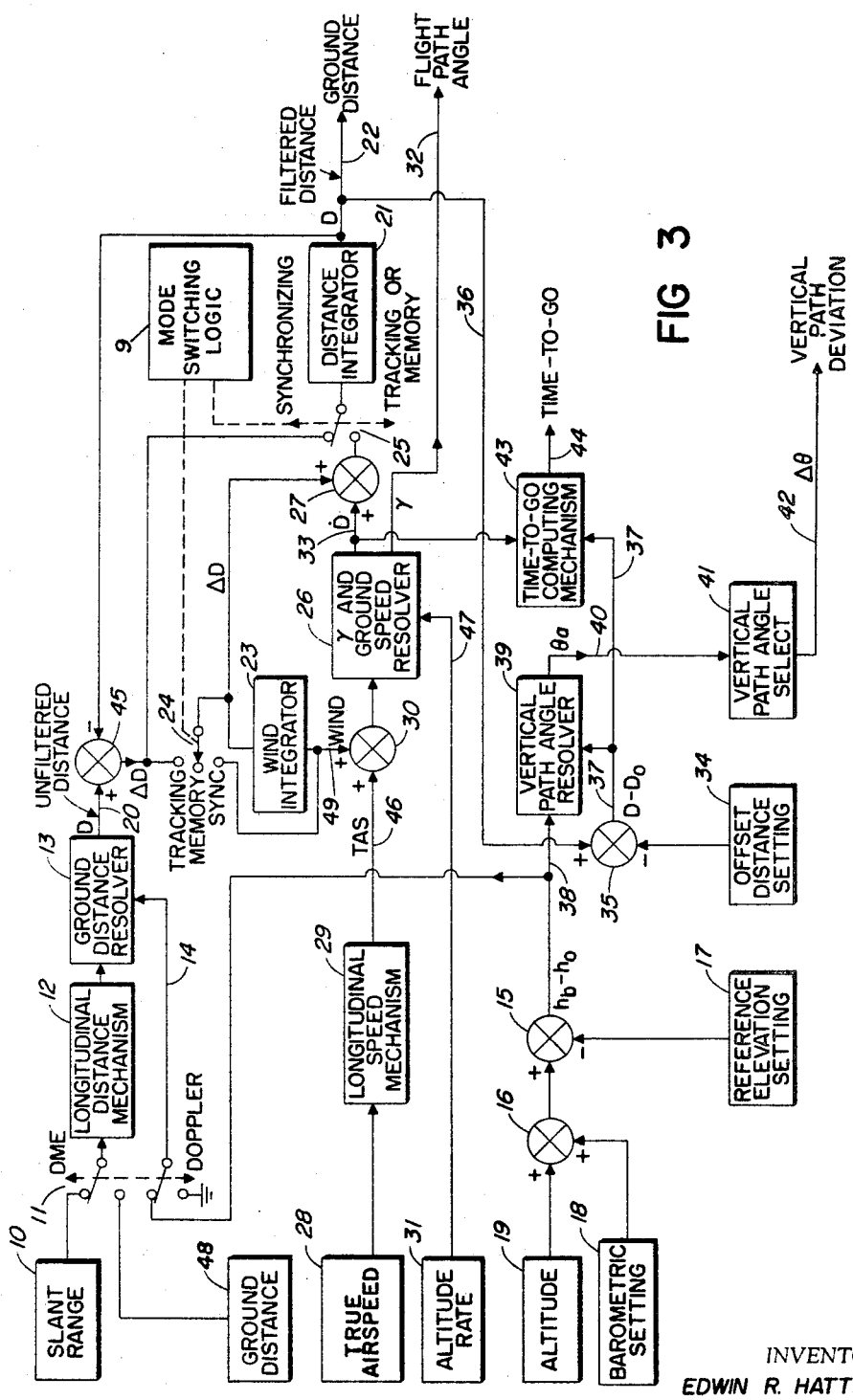
FIGURE 3 is a system functional block diagram of the vertical path computer.
Figure 5:
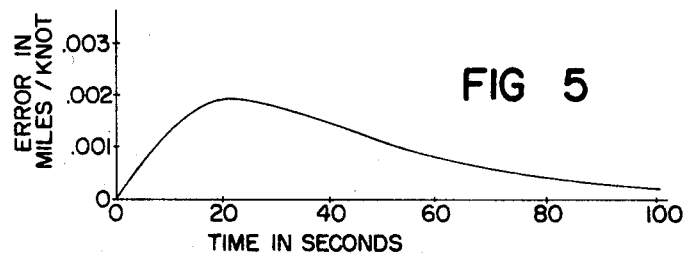
Figure 6:
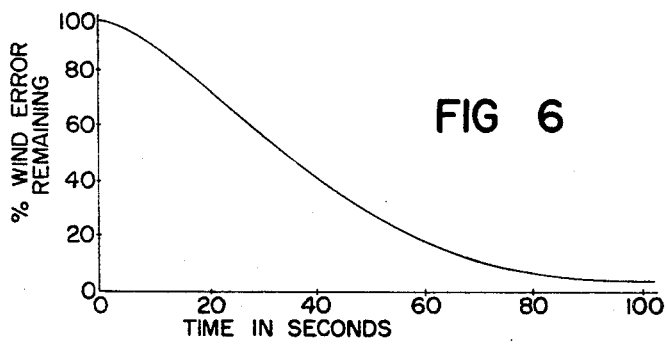
Figure 7:
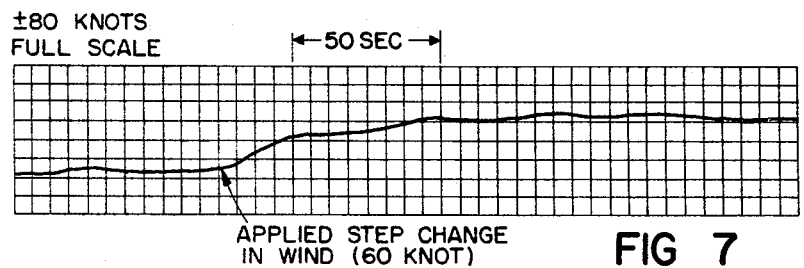

FIGURES 5, 6, and 7 represent theoretical error functions and transient analysis of a computer in accordance with the present invention; and, FIGURES 8–14 depict functional schematic diagrams of embodiments of various functional blocks of the system depicted in FIGURE 3.

The basic operation of the present invention is that of developing from input parameters such as DME slant range, altitude, altitude rate and ground speed, output signals which are a reliable indication of distance to a selected way point, deviation from a selected vertical path, time-to-go to arrive at a selected way point, and flight path angle; the latter being a dynamic angle useful for further guidance computation as a damping signal or for flying a selected flight path angle. Each of the output signals is computed on a basis whereby the most reliable frequency components of the input signals are utilized and longitudinal wind effects are nullified.

The invention might best be comprehended by a consideration of the geometry of the basic vertical path computations to be performed. FIGURE 1 illustrates diagrammatically the geometry of these basic vertical path computations wherein;

$D$ = Ground distance defined by an aircraft position and a DME waypoint.
$D_o$ = Offset distance between the waypoint and a selected aimpoint.
$h_b$ = Barometric altitude corrected to sea level reference.
$h_o$ = Reference elevation (waypoint and aimpoint elevation).
$\theta_s$ = Selected vertical path angle.
$\theta_a$ = Actual or present vertical path angle.
$\Delta_\theta$ = Vertical path deviation.
$S$ = Slant range between aircraft and waypoint.

From the vertical path geometry of FIGURE 1 it is desired to compute $\Delta_\theta$, the difference between a selected or desired vertical path and that being actually made good such that the $\Delta_\theta$ signal might be used as an error to steer the aircraft on to the selected vertical path. Reference to the figures shows that the actual vertical path angle $\theta_a$ is equal to $$\tan^{-1}\left[\frac{h_b - h_o}{D - D_o}\right]$$

The ground distance $D$ may be directly available from a Doppler navigation system or other computer source.

Where DME or TACAN is used for longitudinal information, basic ground distance $D$ must be computed from slant range data S. From the geometry of FIGURE 1 it is seen that;

$$D=\sqrt{S^2-(h_b-h_o)^2}$$

Having attained a signal equal to the ground distance D, means may be employed to derive a ground speed signal $\dot{D}$. A computation of time-to-go is based on present aircraft ground speed, as derived by the computer from input distance information, and distance remaining to the aimpoint from the relationship $$TTG=\frac{D-D_o}{\dot{D}}$$

Flight path angle $\gamma$ in the vertical plane, as indicated in FIGURE 2, is quite analogous to the heading angle in the horizontal plane (in the absence of sideslip) and becomes a very advantageous quantity in flight problems. Both flight path angles and heading angles are dynamic angles, indicating the direction of motion of the aircraft at the moment. Flight path angle and heading angle do not define a particular fixed path in space as do VOR or glide slope angular deviations, in that neither heading angle nor flight path angle are geographically referenced.

FIGURE 2 represents heading angle $\psi$ as being an angle between the true airspeed vector in the horizontal plane and north reference. In a similar manner, the flight path angle $\gamma$ indicates the true angle of flight in the vertical plane and may be computed from altitude rate and true airspeed or Doppler ground speed according to $$\gamma=\sin^{-1}\frac{\dot{h}}{TAS}$$

where
$\gamma$=flight angle
$\dot{h}$=altitude rate
$TAS$=true airspeed

The functioning of the computer of this invention may now be described in terms of the system block diagram of FIGURE 3 with various basic computations being considered on a somewhat individual basis with brief consideration to various implementations which might comprise the functional blocks of the system.

*FIGURE 3—General system*

FIGURE 3 represents a functional block diagram of the vertical path computer system in accordance with the invention. Those functional blocks to the left and along the bottom of FIGURE 3 are sources of input information to the computer per se. Thus, as indicated, a slant range source 10 might be the signal output from a DME or TACAN distance measuring facility. An alternate input to slant range 10 might be from a ground distance source 21 as computed from a Doppler or other navigational computer where the signal is proportional to the ground distance between aircraft and the transmitting source. The true airspeed source 28 represents a signal source which might stem from a Doppler or navigational computer or other type of air data computer. An altitude rate source 31 indicates a source of signal proportional to the rate of change of the altitude or computed vertical speed of the aircraft. This signal would preferably be a computed vertical speed signal such as defined in my copending application, Ser. No. 339,703, filed Jan. 23, 1964, entitled "System for Development of Complemented Vertical Speed in Aircraft," and assigned to the assignee of this invention.

Input parameters from altitude block 19, barometer setting 18, and reference elevation setting 17 are instrumental in the development of a differential barometric altitude which takes into consideration the reference altitude of the waypoint or DME location, the aircraft altitude, etc. Offset distance setting 34 is instrumental in inserting into the computer package a signal proportional to the offset distance of $D_o$ of FIGURE 1, that is, the distance between the actual DME or waypoint location and a selected ground aimpoint from which a vertical path is to be referenced.

*Computation of basic unfiltered distance D*

Distance definitive input parameters to the computer are indicated in FIGURE 3 as being slant range data from DME or TACAN equipment 10 or ground distance per se from a ground distance computation source 48 such as might be provided in a Doppler or other navigation computer equipment. The first computation performed therefore is the development of what will be termed an unfiltered distance signal which is developed as a follow-up of the Doppler or ground distance input or, alternatively, as a computation of ground distance from slant range input obtained from the DME or TACAN equipment. A selector switch 11 is provided which in a first illustrated position, selects the DME input 10 to the computation circuitry along with a differential altitude input from mixer 15; while in a second position the distance input from a Doppler or navigational computer is applied directly, and the differential altitude input is unnecessary since no computation is involved, but a mere follow-up arrangement is effected to develop the unfiltered distance signal 20.

Figure 8:
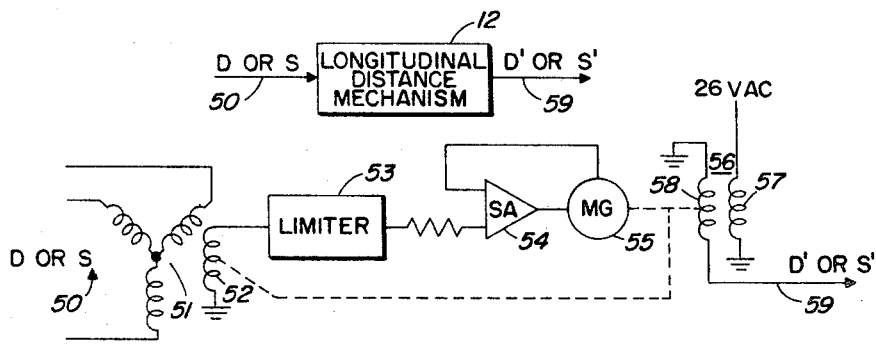

The slant range input from DME 10 or the actual ground distance from ground distance source 48 is applied to a longitudinal distance mechanism 12. Reference is made to FIGURE 8 which illustrates an embodiment for longitudinal distance mechanism 12. The device is essentially a follow-up or conversion arrangement wherein a differential three-wire distance definitive input signal, as selected by the function switch 11 in FIGURE 3, is applied to the stator winding 51 of a synchro. The output of the synchro rotor 52 is applied through a limiter 53 to a follow-up servo system comprising a servo amplifier 54 and motor generator 55. A rate feedback is taken from the generator portion of the motor generator 55 and fed back to the amplifier 54. The output shaft of the motor generator 55 positions the rotor 52 of the synchro to a null such that the shaft position is definitive of the input signal. This shaft rotates the rotor 58 of a linear synchro transformer 56 the stator winding 57 of which is connected to a source of the alternating current signal. The distance output 59 is that induced in the rotor winding 58 of the synchro transformer and is a two-wire output the magnitude of which is proportional to the input signal 50 to the distance mechanism. Thus, the longitudinal distance mechanism 12 functions to regenerate a two-wire signal definitive of the input thereto.

The output 59 from linear synchro transformer 56 (FIGURE 8) is fed to a ground distance resolver 13 (FIGURE 3). The ground distance resolver 13 receives a second input 14 equal to differential altitude when the input distance parameter is that from source 10. From these inputs a triangular solution for ground distance D may be obtained from slant range and altitude. When Doppler or navigation computer input information is utilized, the input to the ground distance resolver 13 is only that from the longitudinal distance mechanism 12.

Figure 9:
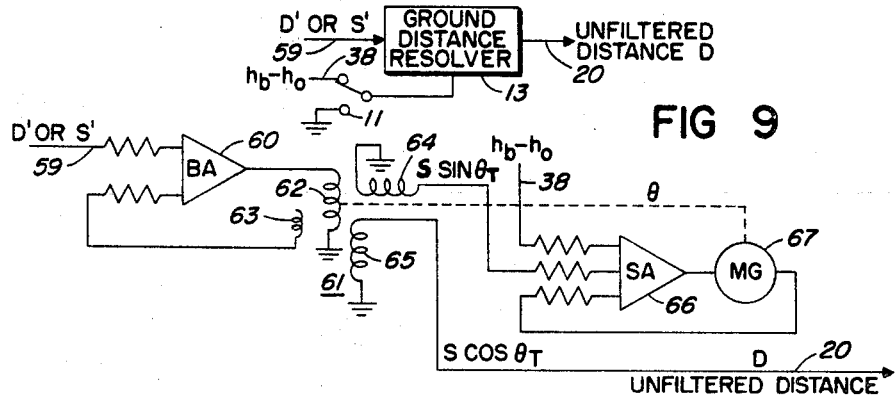
Figure 10:
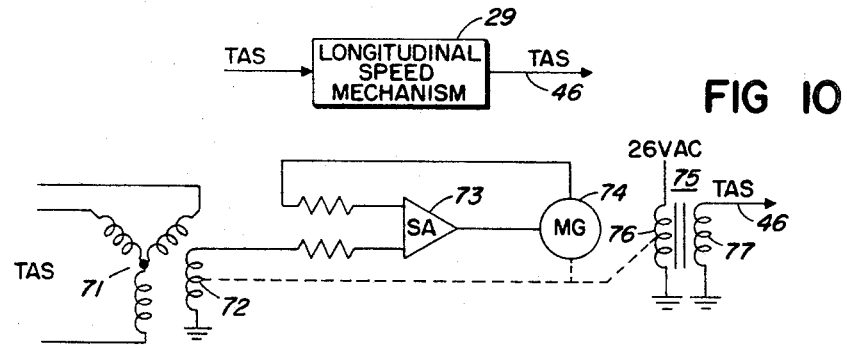

The ground distance resolver 13 is implemented in FIGURE 9. Consideration might first be given to the development of the differential altitude signal which, with reference to FIGURE 3, is seen to be developed from input supplied the computer from altitude source 19, barometer setting 18, and reference elevation setting 17. The differential barometric altitude $\Delta_h$ is a signal proportional to the height of the aircraft above the DME or TACAN station. The signal is derived from mixing the signals from altitude source 19 and barometric setting 18 within mixer 16 and subtracting the reference elevation setting (height of DME antenna above ground) in a further mixer 15, such that the output 38 from mixer 15 is differential altitude, i.e., the height of the aircraft above the DME station.

With reference now to FIGURE 9, and assuming that the selector switch 11 of FIGURE 3 is the DME position, the ground distance resolver 13 receives DME distance and differential altitude as inputs thereto. The distance input 59 is applied through a buffer amplifier 60 to the rotor 62 of a resolver 61. Resolver 61 might be a feedback compensated resolver which further includes a feedback rotor winding 63 connected to the buffer amplifier 60 to increase the resolving accuracy. Stator windings 64 and 65 of resolver 61 have induced therein signals proportional to the voltage appearing on rotor winding 62 modified respectively by $\sin \theta$ and $\cos \theta$, where $\theta$ is the angular relationship existing between the resolver rotor and stator. The sine winding 64 thus produces a voltage proportional to $S \sin \theta$, where S is the voltage proportional to slant range. The output from the "sine" winding 64 is combined differentially within servo amplifier 66 with the differential altitude signal 38. The output from servo amplifier 66 drives a motor generator 67 the shaft position of which drives the rotor 62 of resolver 61. In essence then the servo system positions the shaft 68 such that $S \sin \theta$ equals differential altitude $(h_b - h_o)$ as is effected when the shaft position $\theta$ of the resolver rotor 62 equals the angle $\theta_t$ of the geometry of FIGURE 1.

The cosine winding 65 of resolver 61 then becomes $S \cos \theta_t$ which, with reference to the geometry of FIGURE 1, is seen to be the ground distance D to the waypoint.

When the input to the longitudinal distance mechanism is that stemming from a Doppler or navigational computer source 21, the function switch 11 of FIGURE 3 is seen to disconnect the differential altitude signal 38 from the ground distance resolver 13 such that the input 38 to the servo amplifier 66 of FIGURE 9 is grounded. In this mode of operation, the longitudinal distance mechanism 12 merely follows the Doppler or navigational computer input distance and the signal passes through the distance mechanism 12 and ground distance resolver 13 unaltered since a zero altitude signal is then sent to the resolver 13.

Thus the system develops an unfiltered distance output 20 from ground distance resolver 13 which is proportional to the ground distance D. The system automatically converts slant range S from DME to ground distance D by including for this mode, a differential altitude input.

*Computation of distance output, ground speed and flight path angle*

The next basic computation of the computer is that of the development of an output filtered distance signal, a ground speed signal, and a flight path angle, each of which are computed so as to include automatic longitudinal wind compensation. These computations are performed on the basis of three computer operating modes; synchronization, tracking and memory.

Previous discussion has shown the development of what was termed a basic unfiltered distance signal 20 from the output of the ground distance resolver 13. The computer utilizes this signal, which is the distance along the ground from the aircraft position to the DME station, to develop a filtered and improved output distance signal 22. Additional input to this portion of the computer circuitry will be that of a true airspeed signal (TAS) and altitude rate ($\dot{h}$). In addition to the development of an improved output distance signal, the computer produces an output proportional to flight path angle and augmented ground speed D, wherein all three signals—those proportional to distance, ground speed and flight path angle include appropriate compensation for longitudinal wind. Because the development of these signals is based on an integral relationship, their development will be discussed in terms of the three computer modes of operation.

The unfiltered distance signal 20 was seen to have been computed from slant range or as a follow-up from Doppler or navigational computer signals so as to be a signal proportional to the distance on the ground between the aircraft and waypoint. Before proceeding with the discussion of the further computations, the development of the input parameters proportional to true air speed and altitude rate might be briefly discussed. With reference to FIGURE 3, a signal from a ground speed or true air speed input source 28 is applied to a longitudinal speed mechanism 29. Longitudinal speed mechanism 29 is shown embodied in FIGURE 10 as a follow-up means employing a linear synchro transformer and servo by means of which a three-wire input signal from the source 28 to FIGURE 3 is first applied to the stator 71 of a synchro. The signal developed on synchro rotor 72 is applied to a servo amplifier 73. A motor generator 74 is positioned in accordance with the output of amplifier 73 and thus positions the motor generator 74 and synchro rotor 72 to a null position such that the shaft position thereof corresponds to true air speed. Since the shaft additionally positions the rotor 76 of a linear synchro transformer 75, a proportional voltage from an AC source applied to the rotor 76 is induced in the stator 77 to produce an output 46 in the form of a two-wire signal proportional to true air speed. Referring then to FIGURE 3, the true air speed signal 46 is seen to be applied to a mixer 30 for the purpose of being utilized in output distance, ground speed and flight path angle computations.

In addition to true air speed, an altitude rate signal $\dot{h}$ will be additionally employed. Flight path angle $\gamma$ was previously defined as a dynamic angle the sine function of which is equal to the ratio of the altitude rate to true air speed. As will be further discussed, the ultimate application of the true air speed signal 46 and altitude rate 47 from source 31 to the flight path angle and ground speed resolver 26 effects a solution of the flight path angle from the true air speed and altitude rate input parameters. In a preferred embodiment, the altitude rate signal would be a sophisticated development employing a filtered technique such that the signal is extremely reliable and comprised of the best long and short term components for ultimate reliability.

Further discussion will now pertain to the manner in which the unfiltered distance signal 20, the true air speed signal 46, and the altitude rate signal 47 are employed to derive output distance signal 22, ground speed 33 and flight path angle 32.

*Synchronizing mode—Output signal development*

In the synchronizing mode, the distance integrator 21 of FIGURE 3 functions as a follow-up servo, due to a feedback from the output thereof through mixer 45 and function switch 25. Any discrepancy between the distance output 22 of integrator 21 and the unfiltered distance signal 20 applied to mixer 45, is carried through switch 25 in the synchronizing position thereof to the input of the integrator 21. Thus, in the synchronizing mode, the output distance 22 is made equal to unfiltered ground distance input 20 by a simple follow-up servo technique. Although no circuitry will herein be described concerning the operation of the function switch 25, it is to be understood that the switch would be logic operated (mode switching logic block 9) such that the switch will be in the "synchronizing" position during, for example, cross country flight prior to the reception of the localizer beam when tracking filtering cannot be accomplished because of uncertainty in aircraft direction of flight. During this mode the computer would merely follow-up the unfiltered ground distance signal 20 in a synchronizing fashion such that, at the initiation of subsequent computations for approach flight modes, no undue transient would be introduced into the control circuitry due to a large discrepancy between the unfiltered distance signal 20 and the output distance signal 22 from which longitudinal steering signals would ultimately be formulated.

Figure 14:
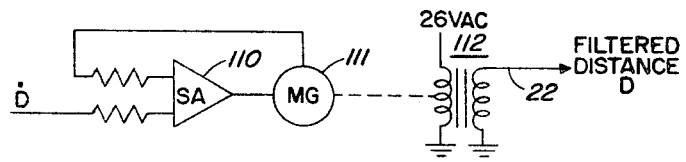

An embodiment of distance integrator 21 is shown in FIGURE 14. The integrator might comprise a servo system including a servo amplifier 110 to which the input signal is applied. A motor generator 111 is driven in accordance with the output of amplifier 110 to position the rotor of a linear synchro transformer 112 at a rate which is proportional to the input to amplifier 110. The voltage induced in the stator of the transformer 112 thus becomes proportional to the integral of the input to the amplifier 110. For the synchronizing mode (with a feedback from filtered distance output 22 through mixer 45 and mode switch 25) the servo of FIGURE 14 functions as a simple follow-up mechanism to develop an output 22 equal to unfiltered distance 20 as it is applied to mixer 45.

*Tracking mode*

Further logic switching means, the details of which are not illustrated or considered here, would operate function switches 24 and 25 of FIGURE 3 to "tracking" position. In tracking mode, the distance integrator circuitry is changed so that it responds more slowly to the changing input unfiltered distance 20. Ground distance thereby becomes filtered with an equivalent low pass filter. A derived ground speed signal 33 is also fed into the distance integrator to complement for the lag which would otherwise be injected into ground distance output because of the filtering process.

In tracking mode, switch 24 connects the output from mixer 45 to wind integrator 23 and to a further mixer 27, while function switch 25 removes the direct feedback loop around distance integrator 21 and instead completes the loop through mixer 27 to integrator 21. Switch 24, when in the previous synchronizing mode, disconnected the output from mixer 45 to wind integrator 23 while connecting the output of the integrator 23 to its input so as to reset the integrator to zero output. The manner in which this reset is effected will be further discussed.

The switching to tracking mode might be effected when a localizer beam or Doppler track is captured, the DME signal is verified as being good, and the vertical path computer is previously synchronized as above described.

The computed ground speed signal 33 originates from the true air speed signal 46. The true air speed signal 46 and the output 33 from wind integrator 23 are combined in mixer 30 and applied to a flight path angle and ground speed resolver 26 along with an altitude rate signal 47. Output distance 22 is effectively then computed by integrating ground speed $\dot{D}$ modified by any discrepancy $\Delta D$ which may exist between the distance output 22 and the unfiltered distance signal 20 as developed in mixer 45. Any $\Delta D$ signal is also applied to the wind integrator 23. A compensating signal is thus added to true air speed by wind integrator 23 which develops an output 49 proportional to longitudinal wind. As a result of the closed feedback loop around the distance integrator 21, if the ground speed signal being fed to the distance integrator 21 is not correct ground speed, the output from distance integrator 21 will develop, from a comparison with the unfiltered distance signal 20 in mixer 45, the $\Delta D$ signal. Wind integrator 23 begins to integrate a correction into the ground speed signal 33. When the transient subsides, $\Delta D$ again becomes zero, and the value of the output 49 from wind integrator 23 becomes correct wind.

Figure 13:
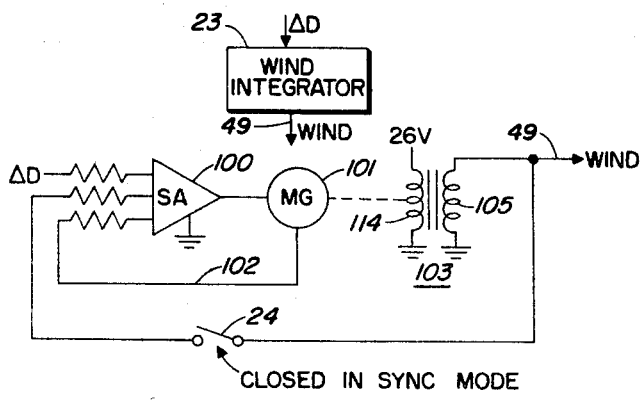

FIGURE 13 illustrates an embodiment of wind integrator 23 as being a rate servo system comprising a servo amplifier 100 to which the $\Delta D$ output from mixer 45 is applied. A motor generator 101 is positioned at a rate which is in accordance with the input to amplifier 100 and thus positions the rotor 104 of a linear synchro transformer 103 to induce in the stator winding 105 thereof an output signal 49 proportional to the integral of the amplifier input, the output signal then becoming longitudinal wind.

During synchronizing mode, the $\Delta D$ input to amplifier 100 is disconnected and mode switch 24 connects the output 49 as input to the amplifier. Since the $\Delta D$ input is then zero, the servo positions the output to equal zero and the integrator is thus reset.

With reference to FIGURE 3, the output from mixer 30, being equal to true air speed plus wind, is applied to $\gamma$ and ground speed resolver 26 to develop derived ground speed 33. Resolver 26 is embodied in FIGURE 12 wherein the true air speed plus wind signal is applied through a buffer amplifier 90 to the rotor winding 92 of a feedback compensated resolver 91. To "sine" winding 94 of resolver 91 develops an output equal to $(TAS+\text{wind}) \sin \gamma$. The signal from winding 94 is applied to a servo amplifier 96 to which is additionally applied the vertical speed signal 47. Reference to FIGURE 2 indicates that the flight path angle $\gamma$ is the angle whose sine equals the ratio of vertical speed to true air speed. The output from servo amplifier 96 positions a motor generator 97 the shaft of which positions the resolver rotor 94 to a null position corresponding to flight path angle $\gamma$. This effects a solution of the flight path angle triangle depicted in FIGURE 2. The shaft 98 of motor generator 97 might then position the rotor of a synchro 99 to develop, if desired, a three-wire output 32 corresponding to flight path angle $\gamma$.

The ground speed signal 33 is developed from winding 95 of resolver 91 the output of which is proportional to $(TAS+\text{wind}) \cos \gamma$ which, in being the horizontal component of the wind corrected air speed vector, becomes derived ground speed 33. It is noted that, since both the flight path angle signal 32 and ground speed signal 33 are computed on the basis of wind compensated true air speed, these output parameters take longitudinal wind into consideration and are compensated therefor.

*Memory mode*

The computer, in including a memory mode of operation, provides for a valid guidance computation in the event of loss of the DME or TACAN distance signal. With reference to FIGURE 3, it is noted that the function switch 25 remains in the lower position for both tracking and memory modes. The function switch 24, however, is noted to disconnect the $\Delta D$ output from mixer 45 from the input of the wind integrator 23. Assuming that the circuitry has been connected in the previously described tracking mode and, because of the loss of DME signal, switch 24 is positioned to the memory position, the derived wind information from integrator 23 is correct. When the computer switches to memory mode, the input to the wind integrator 23 is removed and the output of the integrator 23 becomes a memorized wind. Since the $\Delta D$ input into the distance integrator 21 is also disconnected, the feedback around the integrator 21 is broken and the integrator 21 thus functions as a pure integrator and computes ground distance output 22 on the basis of the ground speed derived from true air speed 46 and memorized wind 49.

The significance of the computation of the above described modes is the development of a flight path angle $\gamma$ compensated for wind on a long term basis. Since the integral of the cosine winding output of the flight path angle resolver 26 was made equal to the horizontal component of DME, it derives ground speed on a long term basis. The ground speed signal from the ground speed resolver 26 becomes an augmented ground speed with long term accuracy from DME and short term accuracy from true air speed. This results in the rejection of high frequency differentiated DME noise. The augmented ground speed signal 33 is thus of increased accuracy and is ultimately used to compute time-to-go. The flight path angle output 32 may be displayed on an indicator. A further use of flight path angle is for damping in guidance computations or for use in flying a selected flight path angle. In any event, the flight path angle 32 herein developed, is one computed from air speed, altitude rate, and ground distance parameters compensated for wind on a long term basis.

Computation of let-down angle and vertical path deviation

The computed or output filtered distance signal 22 is utilized by further resolving circuitry to compute the actual vertical path angle $\theta_a$ from the letdown geometry shown in FIGURE 1. The actual vertical path angle $\theta_a$ is defined as an angle whose tangent equals the ratio of differential altitude $\Delta_h$ to ground distance-to-aimpoint $(D-D_0)$. Reference to FIGURE 3 illustrates that a vertical path angle resolver 39 receives a first input 38 which corresponds to the differential altitude parameter, and a second input 37 corresponding to the ground distance-to-aimpoint $(D-D_0)$. The filtered distance signal 22 is applied through interconnection 36 as a first input to a mixer 35 within which a signal proportional to off-set distance $D_0$ is subtracted. The offset distance setting would be in the form of a signal from a potentiometer or other source, the magnitude of which is proportional to an offset distance as defined by a particular flight situation. This provision enables a degree of versatility whereby the actual ground aimpoint may be something other than the location of the DME or TACAN installation from which ground distance D is computed.

Figure 11:
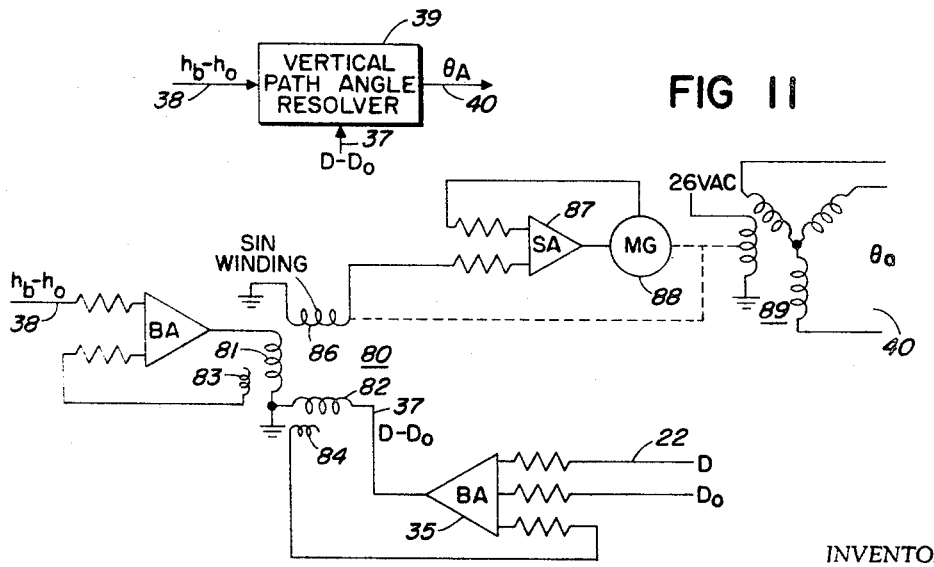
Figure 12:
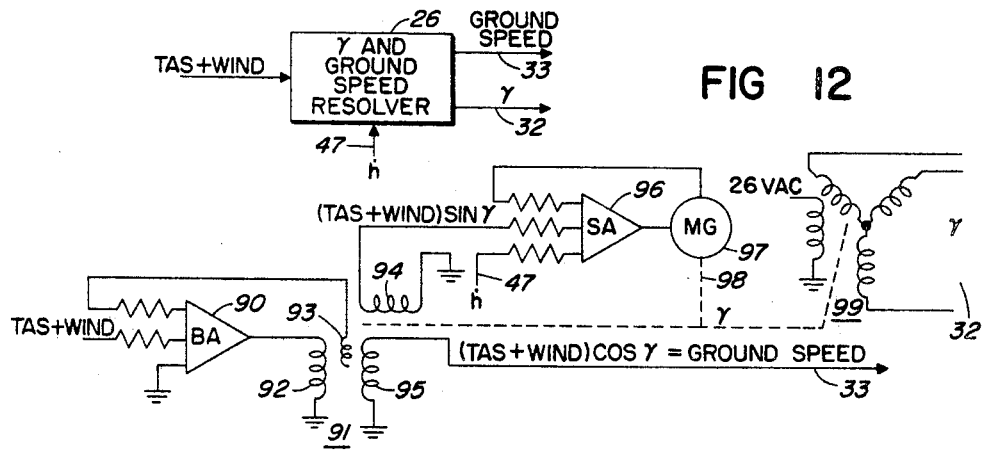

The output 37 from mixer 35 is applied to the vertical path angle resolver 39. A schematic embodiment of the vertical path angle resolver 39 is indicated in FIGURE 11. The differential altitude signal 38 is applied through buffer amplifier to a first stator winding 81 of a feedback compensated resolver 80. The signal 22 proportional to distance and the offset distance from source 34 are applied to a further buffer amplifier which functions as the mixer 35 of FIGURE 3 to develop the ground distance to aimpoint signal 37. Signal 37 is applied to a second stator winding 82 of resolver 80. The resolver includes feedback windings 83 and 84 associated with each of the rotor windings which are applied as feedback signals to the respective buffer amplifiers for resolving accuracy. Winding 86 of resolver 80 has a signal developed therein which is applied to a servo amplifier 87. The output of amplifier 87 drives motor generator 88 whose output shaft positions resolver winding 86 to a null. This effects a solution of the vertical path angle triangle since $\Delta_h$ and $(D-D_0)$ are applied to respective input windings of resolver 80 and the null position between stator and rotor is attained at a shaft position corresponding to the vertical path angle $\theta_a$.

The circuitry of FIGURE 11 further includes a synchro 89 the rotor of which is positioned by the shaft of motor generator 88 such that a three-wire output definitive of the vertical path angle $\theta_a$ is developed. This three-wire output 40 may be compared with a three-wire selected vertical path signal from control 41 of FIGURE 3 so as to produce an output signal 42 the magnitude and phase of which correspond to the extent and sense of error between a selected vertical path angle $\theta_s$ and the actual vertical path angle $\theta_a$. This signal is indicated as $\Delta_\theta$, indicating the angular error between the selected vertical path and the actual vertical path.

Computation of time-to-go

Reference to FIGURE 3 indicates that the derived ground speed signal 33 from the ground speed resolver 26 is applied to a time-to-go-computing mechanism 43 along with the ground distance to aimpoint $(D-D_0)$ signal 37. The time-to-go mechanism 43 might comprise a computing servo which computes time on the basis of the ratio of $(D-D_0)$ to ground speed D.

Transient analysis of distance filtering technique

Because of the importance of the distance filtered technique employed in the computer in the tracking mode, further consideration of this technique is presented on the basis of a theoretical transient analysis of the technique employed. The distance filtering portion of the computer in the tracking mode can be represented by the simplified block diagram of FIGURE 4 wherein $D_i$ is unfiltered distance input and $D_c$ is the computed or filtered distance output. These signals correspond to unfiltered distance output 20 and filtered distance output 22 as previously discussed.

An equation describing output $D_c$ in terms of input $D_i$ and TAS, and the Laplacian operator S can be written as follows, $$D_c = \frac{K_2\left(S + \frac{K_1}{K_2}\cos\gamma\right)}{S^2 + K_2 S + K_1 \cos\gamma} D_i + \frac{S^2}{S^2 + K_2 S + K_1 \cos\gamma}\left(\frac{TAS \cos\gamma}{S}\right) \quad (1)$$

It is seen that for computation of filtered distance, lower frequency components are taken from $D_i$ (distance input resolved from DME slant range) and higher frequency components are taken from TAS. Since flight path angle $\gamma$ normally remains less than 20 to 30 degrees, $\cos\gamma$ will approximately equal one.

For the purposes of analyzing transient noise responses, the following relationships are noted;

$$D_c = D + N_{DME} \quad (2)$$

where D is true distance, $N_{DME}$ is DME distance noise.

$$\frac{TAS \cos\gamma}{S} = D - W\frac{\cos\gamma}{S} \quad (3)$$

where $W$ = wind

Substituting Equations 2 and 3 into (1), and letting $\cos\gamma = 1$, one obtains Equation 4:

$$D_c = D_{true} + \frac{K_2\left(S + \frac{K_1}{K_2}\right)}{S^2 + K_2 S + K_1} N_{DME} - \frac{S^2}{S^2 + K_2 S + K_1}\left(\frac{W}{S}\right) \quad (4)$$

The last two terms of Equation 4 are error terms resulting from DME noise and wind. The filter coefficients of these terms will be evaluated to describe the filtering action.

Before the transient coefficients are evaluated, an expression similar to Equation 4 will first be presented for computed or derived ground speed $GS_c$. The derivation of Equation 5 is similar to the derivation of Equation 4.

$$GS_c = GS_{true} + \frac{K_1}{S^2 + K_2 S + K_1} SN_{DME} - \frac{S^2 + K_2 S}{S^2 + K_2 S + K_1} W \quad (5)$$

Equation 5 also contains error terms, one due to differentiated DME noise and one due to wind. Errors in $GS_c$, if significant, affect time-to-go computations.

Evaluation of transient errors

The magnitude of the error terms of Equations 4 and 5 will now be discussed. The following values of $K_1$ and $K_2$ were chosen after weighing advantages and disadvantages of alternative choices. These values could be modified as the results of flight tests.

$$K_1 = .0025/\text{sec.}^2 = 9 \frac{\text{knots/sec.}}{\text{mile of error}}$$

$$K_2 = .1/\text{sec.} = 360 \frac{\text{knots}}{\text{mile of error}}$$

When the above choices of $K_1$ and $K_2$ are inserted into the denominators of the transient coefficients, a second order pole at .05 rad/sec. ($\omega_m = .05/\text{sec.}$) is obtained.

Going specifically to the first error term of Equation 4, the filtering of DME noise is noted. Recordings of actual DME data which have been observed suggest that DME noise becomes negligible for periods greater than five miles in length. For a letdown at 250 knots this corresponds to a frequency of .09 rad/sec. The low pass filter coefficient of the DME noise term of Equation 4 provides an attenuation of 6 db/octave to higher frequency noise terms, starting at a corner frequency of approximately 0.5 rad/sec. An interesting specific frequency to note concerns the frequency at which individual wires of the DME output potentiometer are traversed. This will typically occur at about 3.4 rad/sec. at which frequency the filter provides an attenuation of about 30 db.

The last error term of Equation 4 can be used to predict the error in $D_c$ which will build up and then go away when tracking is first begun and while proper wind correction is computed. An initial error in wind correction before wind is computed appears as a step function to the filter coefficient at the moment when tracking begins. The theoretical step function time response for the last term of Equation 4 is sketched in FIGURE 5.

From FIGURE 5 it is seen, for example, that the error in distance resulting from an initial uncompensated wind of 20 knots reaches a peak value of only about .04 mile, this peak error occurring 20 seconds after tracking is begun. After 20 seconds, this error heads back towards zero, becoming less than one-tenth maximum value after 100 seconds.

In Equation 5 the first error term represents the contribution of differentiated DME noise to computed ground speed. A certain percent error is ground speed will approximately cause the same percent error in computed time-to-go. Therefore, DME noise contributions to ground speed must be kept low to keep time-to-go readout stable. Differentiated DME noise contributions to ground speed are attenuated with a second order low pass, providing 12 db/octave attenuation to frequencies higher than the corner frequency of .05 rad/sec. For the frequency at which DME potentiometer wires are traversed, the attenuation becomes 73 db.

The last error term of Equation 5 can be used to describe how wind compensation is introduced into computed ground speed. Again, the initial error due to uncorrected wind appears as a step function to the filter coefficient at the moment when tracking begins. The theoretical step function time response for the last term of Equation 5 is sketched in FIGURE 6.

FIGURE 6 indicates that after one minute, only twenty percent of the initial wind error is left. Thus, for example, after one minutes only four knots would remain out of an initial 20 knot error. For a letdown at 250 knots, a four knot error gives a 1.6 percent error in computed ground speed.

FIGURE 7 shows the wind integrator step response of a vertical path computer constructed in accordance with the present invention. The recording shows that approximately 80 percent of the wind step is removed in one minute.

The present invention is thus seen to provide a vertical path computer providing accurate indications of ground distance, flight path angle, vertical path deviation and time-to-go which are advantageously computed from input parameters of distance, air speed and altitude. The output signals are computed in an improved and accurate manner so as to be compensated for longitudinal wind and DME noise.

Although the present invention has been described with respect to a particular embodiment thereof, it is not to be so limited as changes might be made therein which fall within the scope of the invention as defined in the appended claims.

I claim:

1. In an aircraft navigation computer, means for developing an augmented output signal proportional to the ground distance between said aircraft and a ground waypoint, comprising a first input signal proportional to the said ground distance, a second input signal proportional to the true airspeed of said aircraft, a third input signal proportional to aircraft vertical speed, signal resolving means receiving said second and third input signals and developing therefrom an ouput signal proportional to aircraft ground speed, a first signal integrating means, first, second and third signal combining means, said first signal combining means receiving the output from said first integrating means and said first input signal as inputs thereto and developing therefrom the difference signal therebetween, said third signal combining means receiving the output of said first signal combining means and the output of said signal resolving means as inputs thereto and developing the sum thereof, the output of said third signal combining means being applied as input to said first signal integrating means, second signal integrating means, the output of said first signal combining means applied as input to said second signal integrating means, said second signal combining means receiving the output from said second signal integrating means and said second input signal and developing the sum thereof, the output from said second signal combining means being applied as input to said signal resolving means, and said augmented output signal comprising the output from said first signal integrating means.

2. An aircraft flight path computer comprising means for deriving a first signal proportional to the ground distance between an aircraft and a predetermined ground way point, means for developing a second signal proportional to aircraft true air speed, means for developing a third signal proportional to aircraft vertical speed, resolving means receiving said true air speed and vertical speed signals and computing therefrom a fourth signal proportional to aircraft ground speed D from the relationship $\dot{D}=TAS \cos \gamma$ where $TAS$=true air speed and $\gamma=\sin^{-1} \dot{h}/TAS$, first, second and third signal mixing means, a first integrating means, a first switching means for selectively applying one of the respective outputs from said first and third signal mixing means to said first signal integrating means, said first signal mixing means receiving the outputs from said first integrating means and said first signal and developing therefrom an output $\Delta D$ proportional to the difference in magnitude between the input signal thereto, second signal integrating means, a second switching means for selectively applying said $\Delta D$ signal to the respective inputs of said second integrating means and said third signal mixing means, said second signal mixing means receiving the output from said second signal integrating means and said second signal and producing an output equal to the summation of the input signals thereto, the output of said second signal mixing means applied to said resolving means, and said third signal mixing means receiving the output from said resolving means as a further input thereto and producing an output equal to the summation of the input signals thereto, the output of said first signal integrating means comprising an output signal proportional to the ground distance between said aircraft and way point and compensated for longitudinal wind.

3. A signal developing means as defined in claim 2 wherein said first and second switching means respectively comprise a first mode switching means and a second mode switching means, said first mode switching means connected between the output of said first mixing means and the respective inputs of said second signal integrating means and said third signal mixing means to selectively effect connection therebetween, said second mode switching means connected to the input of said first integrating means to selectively connect the output of said first mixing means to said first integrating means in a first position thereof and the output from said third mixing means to said first integrating means in a second position thereof; said first and second mode switching means being operated dependently to mutually effect first, second and third operational modes; said first operational mode effecting connection between said first mixing means and said first integrating means whereby the output of said first integrating means follows said first signal applied to said first mixing means, said first operational mode further effecting a reset of the output of said second signal integrating means to zero, said second operational mode effecting disconnection between said first mixing means and said second integrating means and between said first mixing means and said third mixing means while connecting the output from said third mixing means to said first integrating means whereby the output from said first integrating means is compensated for longitudinal wind and is defined as low-passed input distance compensated by integrated ground speed derived from true airspeed and vertical speed; said third operational mode effecting connection between said first mixing means and said second integrating means and effecting connection between said first mixing means and said third mixing means while maintaining connection between said third mixing means and said first integrating means whereby the output from said first integrating means is a ground distance signal computed on the basis of integrated ground speed derived from true air speed and a memorized longitudinal wind signal from said second integrating means.

4. A signal development means as defined in claim 3 wherein said second integrating means comprises a rate servo.

5. A signal developing means as defined in claim 3 wherein said resolving means comprises an electromechanical resolver including a rotor winding to which is applied the output from said second mixing means, a first stator winding developing an output proportional to the cosine $\gamma$ times the output from said second mixing means, a second stator widing developing an output proportional to sine $\gamma$ times the output from said second mixing means, means combining said second stator output with said signal proportional to said aircraft vertical speeds, means applying said combined signal to a servo motor the output shaft of which positions the rotor of said resolver whereby said output shaft position is proportional to the aircraft flight path angle $\gamma$ from the relationship $$\text{sine } \gamma = \dot{h}/TAS$$

the output from said first resolver stator thereby becoming $(TAS+wind) \cos \gamma$ whereby said first stator output is proportional to aircraft ground speed; said first and second integrating means each comprising a rate servo including a servo amplifier to which the input thereto is applied, a motor generator driven by the output of said servo amplifier, a rate feedback signal from said motor generator connected to the input of said servo amplifier, a linear synchro transformer having a rotor positioned in accordance with the rotation of said motor generator, a signal source supplied to said transformer rotor, the output from the stator of said transformer thereby comprising a signal which is the integral of the input to said servo amplifier.

6. A computer means as defined in claim 5 further including means for developing a signal proportional to aircraft vertical path angle $\theta_a$, where $\theta_a$ equals $$\tan^{-1} \Delta_h/D-D_o$$

and $\Delta_h$ is a differential altitude, defined as the difference between barometric altitude corrected to sea level reference and the reference elevation of a selected waypoint, $D$ is the ground distance between the aircraft and said preselected waypoint, and $D_o$ is the offset distance between said ground waypoint and said ground aimpoint; said means comprising a further electromechanical resolving means comprising first and second stator windings to which are applied respectively signals proportional to said differential altitude and ground distance to aimpoint $(D-D_o)$ a first rotor winding developing a signal proportional to sine $\theta_a$, means applying the output from said first rotor winding to a servo amplifier, a motor generator connected to said servo amplifier and positioned in accordance with the output thereof, the shaft of said motor generator connected to and positioning said first rotor winding whereby said aforedefined servo loop nulls at a shaft position corresponding to aircraft vertical path angle $\theta_a$, and means comprising a synchro including a rotor positioned in accordance with said motor generator shaft position to develop an output signal proportional to the vertical path angle $\theta_a$.

7. A vertical path computer as defined in claim 6 including means for developing a signal proportional to a selected vertical path angle $\theta_s$ and means receiving the selected vertical path signal and said actual vertical path signal $\theta_a$ and developing therefrom a signal $\Delta_\theta$ proportional to the deviation between the actual vertical path and the selected vertical path.

8. A vertical path computer as defined in claim 7 further comprising a time-to-go computing mechanism receiving said signal proportional to ground distance to aimpoint $(D-D_o)$ and said ground speed signal as derived at the output of said first resolving means and computing time-to-go to said aimpoint from the ratio of the input signals thereto.

References Cited

UNITED STATES PATENTS

| | | | |
|---|---|---|---|
| 3,126,474 | 3/1964 | Zweibel et al. | 235—150.27 |
| 2,943,321 | 6/1960 | Karpeles | 235—150.26 |

MALCOLM A. MORRISON, *Primary Examiner.*

F. D. GRUBER, *Assistant Examiner.*